United States Patent [19]

Nayar

[11] Patent Number: 4,893,183
[45] Date of Patent: Jan. 9, 1990

[54] ROBOTIC VISION SYSTEM
[75] Inventor: Shree K. Nayar, Pittsburgh, Pa.
[73] Assignee: Carnegie-Mellon University, Pittsburgh, Pa.
[21] Appl. No.: 231,180
[22] Filed: Aug. 11, 1988
[51] Int. Cl.[4] .............................................. H04N 7/18
[52] U.S. Cl. .................................... 358/107; 358/101; 901/47
[58] Field of Search ......................... 358/107, 101, 93; 901/47

[56] References Cited

U.S. PATENT DOCUMENTS

| | | | |
|---|---|---|---|
| 2,674,917 | 4/1956 | Summerhayes | 358/107 |
| 2,786,096 | 3/1957 | Palmer | 358/107 |
| 3,796,492 | 3/1974 | Cullen | 358/101 |
| 4,160,263 | 7/1979 | Christy | 358/101 |

Primary Examiner—Howard W. Britton
Attorney, Agent, or Firm—Alder, Cohen & Grigsby

[57] ABSTRACT

The present invention pertains to a robotic vision system for identifying the location of objects. The robotic vision system includes a device for recording images, and n elements, where $n \geq 2$ and is an integer. Each of the n elements is disposed at a predetermined position such that each of the n elements is in view of the recording device and reflections of objects from each of the n elements is received by the recording device. The robotic vision system also includes a device for determining the location of objects from the image received by the recording device. The recording device is connected to the determining device to provide the viewed image thereto.

7 Claims, 5 Drawing Sheets

ROBOTIC VISION SYSTEM

FIELD OF THE INVENTION

The present invention relates to robotic vision systems. More specifically, the present invention relates to a three-dimensional robotic vision system that utilizes one camera and at least two elements which reflect light from objects to be located into the camera.

BACKGROUND OF THE INVENTION

Three dimensional object recognition is presently an active area of vision research. The limitations of two dimensional analysis have been realized in many applications. In a typical bin picking operation, the position and shape of an object must be determined to enable the robot to securely grasp the object. An essential part of a three dimensional recognition system is shape extraction. Any ambiguity in the physical shape of an object generally renders the recognition problem more difficult. Hence, the advent of three dimensional vision systems has created considerable interest in the development of high quality depth sensors.

Stereo is a popular technique for depth perception. It has generated much interest in the research community due to its apparently strong resemblance to the mammalian approach to depth perception. In stereopsis, images of the scene are recorded from two different perspectives. The two perspectives are obtained by using two cameras to observe the scene. Features such as edges are extracted from both images and a point-to-point correspondence is established between the images on the basis of feature values. Range or depth is recovered from each pair of corresponding points by triangulation. The passive nature of stereopsis makes it an attractive depth perception method. It is suited to most applications, unlike "active" sensing methods such as radar, laser ranging and structured light.

Stereo systems have a limited field of view. The depth of a point can be measured only if the point is seen by both cameras. Therefore, the field of view of a stereo system is the intersection of the fields of view of the two cameras. The field of view of a typical stereo system, is shown in FIG. (8). Depth can be measured only at those points that can be seen in both the camera images. Therefore, the field of view of a stereo system is the intersection of the fields of view of the two cameras. A large field of view can be obtained by minimizing the baseline D and keeping the viewing directions of the two cameras almost equal. Such an arrangement, however, results in lower depth resolution. A high resolution in depth is obtained by making the viewing directions of the two cameras orthogonal to each other. However, this configuration drastically reduces the field of view of the stereo system. Also, in stereo, objects must be placed close to the focal plane of both cameras in order to avoid the blurring of image points.

Furthermore, stereo systems are posed with the acute problem of calibration. Corresponding points in the two images are projections of single point in the three dimensional scene. In order to triangulate and determine the three dimensional coordinates of a point, the parameters of the two cameras must be known. Therefore, for a given configuration of the cameras, calibration of the intrinsic and extrinsic parameters of the cameras is necessary. Many researchers have studied the stereo calibration problem. One approach is to independently calibrate the two cameras by using a set of points at known locations in a common frame of reference. An alternative method does not rely on knowing the locations of the calibration points, but rather the correspondence between the points in the images. D. B. Gennery, "Stereo-Camera Calibration", Proceeding Image Understanding Workshop, pp. 101-108, November, 1979. proposed performing the calibration by a generalized least-squares adjustment. Errors are formulated by using the epipolar constraint. Minimization of the errors result in estimates of the camera parameters. O. D. Faugeras and G. Toscani, "The Calibration Problem for Stereo", IEEE, 1986. Have suggested a recursive estimation of the camera parameters by using extended Kalman filtering. The complexity of the calibration procedure has limited the applicability of stereo systems. Since it is computationally inefficient to perform the calibration on-line, the relative positions and orientations of the cameras need to be rigidly fixed.

The present invention is a new approach to stereo vision. Essentially, two spheres with highly reflective surfaces are placed in the view of a single camera. Reflections of the three dimensional scene are recorded in the image of the spheres. Hence, a single camera image has two different perspectives of the three dimensional world. These two perspectives are equivalent to images obtained from two different camera locations in stereo systems. The use of a single fixed camera avoids the stereo calibration problem. However, the position of the two spheres must be known to be able to recover depth by triangulation. To this end, a simple calibration procedure determines the location of the two spheres in real time. In other words, each camera image contains information regarding the positions of the spheres and the depth of points in the three dimensional world, at the same instant of time. Hence, the positions of the spheres are first determined and then used to compute the depth of points in the scene. Such a system is known as a sphereo system.

SUMMARY OF THE INVENTION

The present invention pertains to a robotic vision system for identifying the location of objects. The robotic vision system comprises means for recording images, and n elements, where $n \geq 2$ and is an integer. Each of the n elements is disposed at a predetermined position such that each of the n elements is in view of the recording means and reflections of objects from each of the n elements is received by the recording means. The robotic vision system is also comprised of means for determining the location of objects from the image received by the recording means. The recording means is connected to the determining means to provide the viewed image thereto.

Other details, objects and advantages of the invention will become apparent as the following description of the presently preferred embodiments and presently preferred methods of practicing the invention proceeds.

BRIEF DESCRIPTION OF THE DRAWINGS

In the accompanying drawings, the preferred embodiments of the invention, the preferred methods of practicing the invention are illustrated in which.

DESCRIPTION OF THE PREFERRED EMBODIMENT

Figure 3:
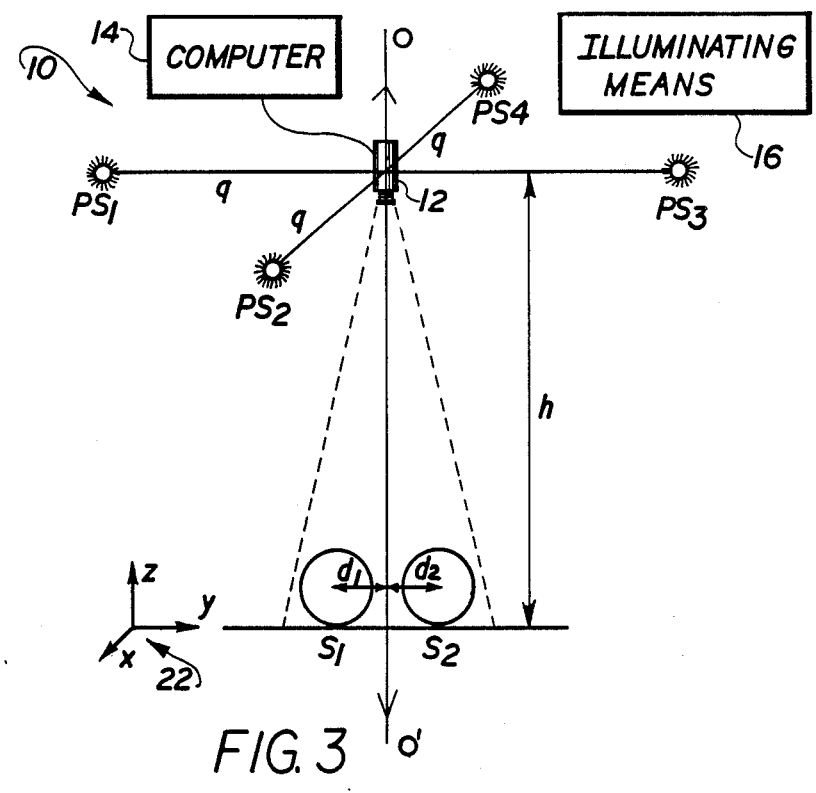
FIG. 3 shows two spheres placed on an x-y plane of a world frame of reference.

Referring now to the drawings, where like reference numerals refer to identical or similar parts throughout the several views and more specifically to FIG. 3 thereof there is shown a robotic vision system 10 for identifying the location of objects PS. The robotic vision system 10 comprises means for recording images, such as a camera 12, and n elements, where $n \geq 2$, and is an integer. Preferably, an element is a specular sphere S. While FIG. 3 shows only two spheres $S_1$, $S_2$ for simplicity with respect to the explanation of the sphereo system 10 there can be additional spheres S used in a sphereo system 10. Each sphere is preferably fixed in a predetermined position and has a glossy surface that is highly reflective of light.

Each of the n spheres is disposed at a predetermined position such that each of the n spheres is in view of the camera and reflections of objects PS from each of the n spheres is received by the camera 12. (Note that the sphereo system 10 works equally as well with objects that are active emitters of light rather than passive emitters of light which just reflect light.)

The sphereo system 10 also is comprised of means for determining the location of objects for the image received by a camera. Preferably, the determining means is a computer 14. The camera 12 is connected to the computer 14 to provide the viewed image thereto. The computer 14 calculates with respect to a given reflection in one of the n elements the epipolar curve for the reflections in each of the other spheres S in order to determine corresponding reflections from each spheres. The computer 14 determines from the corresponding reflections from each sphere the location of the object $PS_i$ associated with the corresponding reflections. The sphereo system 12 also is preferably comprised of an illuminating means 16 for illuminating the objects $PS_i$.

The use of specular spheres S enable the sphereo system to measure depth outside the field of view of the camera 12. This is because the surface of a sphere completely spans the normal space. Hence, points in essentially all directions are reflected by the spheres S into the camera 12. The camera 12 is only used to observe the surfaces of the spheres S.

Figure 1:
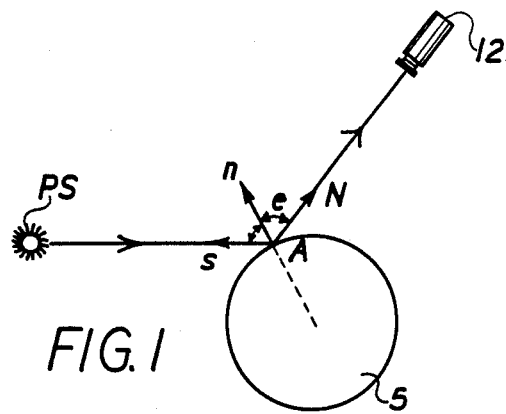
FIG. 1 shows the reflection of light from an object, off the surface of a specular sphere.

The following is an explanation of the theory and the operation of the sphereo system 10. A sphere S has several properties that make it preferably for use in the sphereo system 10. The geometry of a sphere S is completely defined by its radius. The sphere also possesses the property that no two points on its surface have the same surface normal. FIG. 1 shows the reflection of light from an object PS off the surface of a specular sphere S. In the case of specular reflection, the angle of incidence i equals the angle of reflection e. For orthographic projection, all of the light rays observed by the camera 12 are parallel and are in the direction v. Under the above-stated constraints, only a single point A on the surface of the sphere S is capable of reflecting light from the object PS into the camera 12. An alternative interpretation of this effect is as follows: If the position of the center of the sphere S and its radius are known, then a bright point in the image can be projected out of the camera 12 to intersect the surface of the sphere S at point A. The surface normal n at the surface point A is unique and is easily determined. Given the viewing direction v and the surface normal n, the source direction s can be found by using the specular reflectance model. (Note, herein a darkened letter is identified as a vector.)

Figure 2:
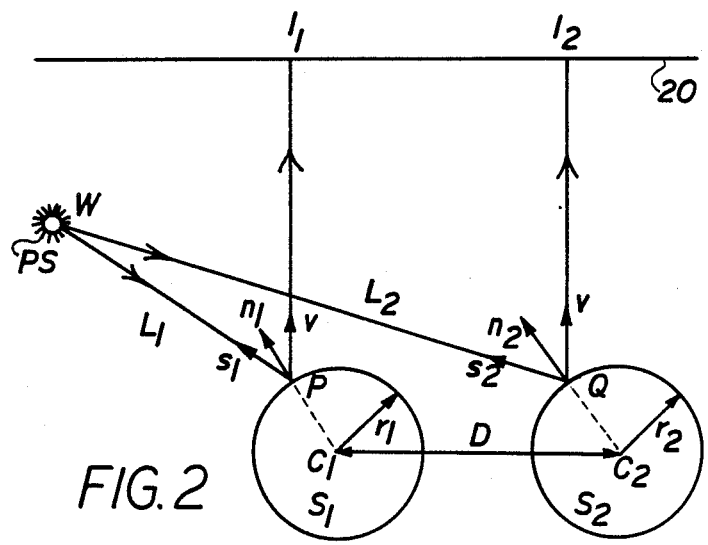
FIG. 2 shows two spheres illuminated by an object.

The sphereo system 10 uses two specular spheres $S_1$, $S_2$ of known radii and center positions, each reflecting the world in the direction of the camera 12. FIG. 2 shows the two spheres illuminated by an object PS. The resulting image has two discrete bright points $I_1$ and $I_2$. Lines perpendicular to the image plan are projected from $I_1$ and $I_2$ to intersect the spheres $S_1$ and $S_2$ at the points P and Q, respectively. The surface normal vectors $n_1$ and $n_2$ at the points P and Q are computed by using the known radii and center locations of the spheres. Since the spheres are separated by a distance D, the surface normal vectors $n_1$ and $n_2$ differ in direction. Given $n_1$, $n_2$ and the viewing direction v, the source directions $s_1$ and $s_2$ are computed. The object PS lies on the line $L_1$ passing through the point P in the direction $s_1$. The object PS also lies on the line $L_2$ passing through the point Q in the direction $s_2$. Therefore, the object PS is at location W found at the point of intersection of the two lines $L_1$ and $L_2$. The object PS has been used in the above discussion to explain the underlying principle. In practice, however, candidates for matching are not confined to bright image points and may be characterized by features such as discontinuities in image intensity.

The measurement of depth using a sphereo system 10 is based on the knowledge of the radii and the positions of the spheres S in the world. The radius of each sphere S is measured. The position of the spheres S with respect to each other and the camera 12 can be fixed. This, however, makes the system 10 sensitive to mechanical vibrations. In order to avoid inaccuracies in the positions of the spheres, a calibration procedure is preferably built into the system to determine the world coordinates of the centers of the two spheres $S_1$, $S_2$.

Figure 4:
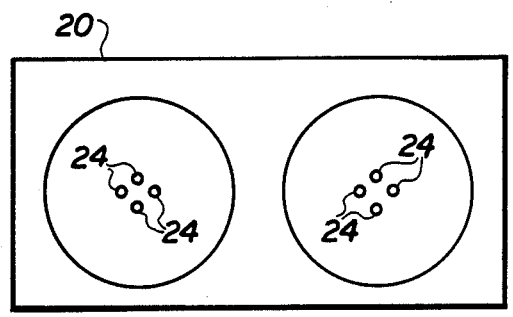
FIG. 4 shows reflections of 4 objects as seen in an image of the surfaces of two spheres.

FIG. 3 shows the spheres $S_1$ and $S_2$ placed on the x-y plane of the world frame 22. The z coordinate of the center of each sphere is equal its radius r. However, the x and y coordinate of the center need to be determined. Four objects $PS_1$, $PS_2$, $PS_3$ and $PS_4$ are positioned symmetrically about the optical axis O—O' of the camera 12. The objects are coplanar and each object is at a distance q from the optical axis. Consider any one of the two spheres $S_1$ and $S_2$. The distance d of the sphere center from the optical axis is small compared to the height h of the four objects from the x-y plane and the distance q of each source from the optical axis. As shown in FIG. 4, four highlights 24 are seen in the image of the sphere. Let $(X_i, Y_i)$ be the center of mass of the points corresponding to object $PS_i$. The centroid $O(X_c, Y_c)$ of the four highlights may be determined as:

$$X_c = \frac{1}{4} \sum_{i=1}^{4} X_i, \quad (1)$$

$$Y_c = \frac{1}{4} \sum_{i=1}^{4} Y_i.$$

Under the distant object assumption, the image point $O(X_c, Y_c)$ is the projection of the center of the sphere onto the image. Theoretically, the point O may be determined by using only two objects rather than four. In practice, however, a better estimate of the centroid is obtained by using a greater number of objects.

The next step is to find sphere center $C(x_c, y_c, z_c)$ in the world frame. Transformations between the world and the image are determined by the intrinsic and extrinsic parameters of the camera 12. During the process of image formation, a point $P(x,y,z)$ in the world is projected onto the point $I(X,Y)$ in the image. The camera parameters may be used to determine $I(X,Y)$ from $P(x,y,z)$. However, it is not possible to recover a world point from an image point. For each image point $I(X,Y)$ the camera 12 parameters can only determine the equation of a line in the world on which the point $P(x,y,z)$ lies. Therefore, the center of the sphere lies on the line:

$$x_c = az_c + b, \quad (2)$$

$$y_c = cz_c + d,$$

where the transformation parameters a,b,c, and d are determined by the camera parameters and the image coordinates $X_c$ and $Y_c$. Since the sphere S is placed on the x-y plane, $z_c = r$. Hence, the world coordinates $(x_c, y_c, z_c)$ of the center are uniquely determined from equation (2). The radius of a sphere is measured in pixels in the image and inches in the world frame. The spheres $S_1$ and $S_2$ have radii $R_1$ and $R_2$ in the image and $r_1$ and $r_2$ in the world. The centers of the spheres will be referred to by $O_1(X_{C1}, Y_{C1})$ and $O_2(X_{c2}, Y_{c2})$ in the image, and $C_1(x_{c1}, y_{c1}, z_{c1})$ and $C_2(x_{c2}, y_{c2}, z_{c2})$ in the world. The simplicity of the calibration procedure described herein, makes it feasible for it to be performed on-line. In other words, if the four calibration objects are always turned on, then each image that is digitized by the computer 14 describes the positions of the spheres and the state of the world at the same instant of time.

Prior to computing the depth of scene points, a sphereo system 10 is required to solve the well-known correspondence problem: the task of determining which point in the image projection of one sphere corresponds to a particular point in the image projection of the other sphere. Features such as edges are extracted from the two circular sections in the image that correspond to the projections of the spheres $S_1$ and $S_2$. A feature value at the image point $A(X,Y)$ may be expressed as $F\{A(X,Y)\}$. The image points $I_1(X_1,Y_1)$ and $I_2(X_2,Y_2)$ constitute a corresponding pair of points when they lie on different spheres and have matching feature values:

$$F\{I_1(X_1, Y_1)\} = F\{I_2(X_2, Y_2)\}, \quad (3)$$

where $$|I_1 - O_1| < R_1$$

and $$|I_2 - O_2| < R_2.$$

Depth values are recovered from pairs of corresponding image points by triangulation. Consider the image points $I_1$ and $I_2$ in FIG. 2. Since both points are reflections of the same point in the world, they satisfy the constraints given in equation (3), and thus constitute a pair of corresponding points. The point $I_1(X_1, Y_1)$ is a projection of the point $P(x_1, y_1, z_1)$. Since it is known that $P(x_1, y_1, z_1)$ lies on the line:

$$x_1 = az_1 + b, \quad (4)$$

$$y_1 = cz_1 + d,$$

where a,b,c, and d are determined by the camera parameters and the image coordinates $X_1$ and $Y_1$, the point $P(x_1, y_1, z_1)$ also lies on the surface of sphere $S_1$. Therefore, $$(x_1 - x_{c1})^2 + (y_1 - y_{c1})^2 + (z_1 - z_{c1})^2 = r_1^2. \quad (5)$$

Equation (4) may be used to eliminate $x_1$ and $y_1$ in equation (5). This results in a quadratic equation in $z_1$. As shown in FIG. 3, the camera 12 is positioned in the positive z direction and thus the point P lies on the upper hemisphere on $S_1$. Therefore, $z_1$ is the higher of the two roots of the quadratic equation. The $x_1$ and $y_1$ coordinates of P are then computed by using equation (4). At point P, the unit vector $v_1$ in the viewing direction is determined from equation (4) as:

$$v_1 = V_1/|V_1|, \quad (6)$$

where, $$V_1 = (a, b, 1).$$

The unit surface normal vector $n_1$ at the point P on the sphere $S_1$ is computed as:

$$n_1 = P - C_1/r_1. \quad (7)$$

In order to find the location of the point W in FIG. 2, the direction of W as seen from point P needs to be determined. Let the unit vector in this direction be $s_1$. For specular reflections on the surface of the spheres, the angle of reflection equals the angle of incidence. This specular constraint may be used to relate the three vectors $s_1$, $n_1$ and $v_1$:

$$[n_1 \cdot v_1] n_1 = v_1 - s_1/2. \quad (8)$$

The object direction $s_1$ is determined by rewriting equation (8) in the form:

$$s_1 = v_1 - 2[n_1 \cdot v_1] n_1. \quad (9)$$

On the same lines, object direction $s_2$ is computed from the image point $I_2$. A line is projected from $I_2$ to intersect sphere $S_2$ at the point $Q(x_2, y_2 z_2)$. The object direction $s_2$ is computed by invoking the specular constraint. The line $L_1$ in FIG. 2 passes through point P in the direction $s_1$. The line $L_2$ passes through point Q in the direction $s_2$. The point W is found at the intersection of lines $L_1$ and $L_2$.

Figure 5:
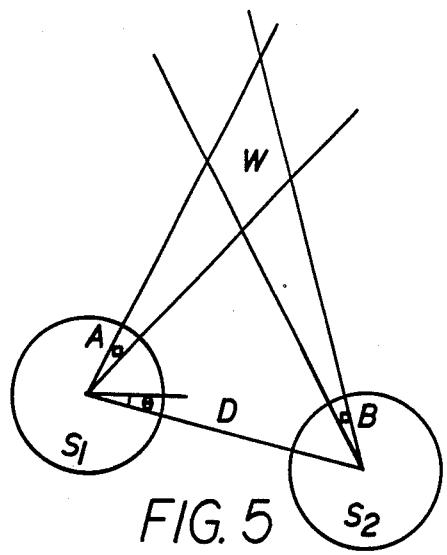
FIG. 5 illustrates triangulation uncertainty in the two dimensions of an image plane.

The accuracy of a sphereo system 10 is dependent on the resolution of measured depth. As in the case of stereo, depth resolution is related to pixel resolution in the camera 12 image. FIG. 5 illustrates triangulation incertainty in the two dimensions of the image plane 20. The pixels A and B constitute a pair of matching image points. Uncertainty in the location of point W is represented by the shaded region. Therefore, errors in triangulation result from image quantization; due to finite resolution in the image and the location of the point W from the two spheres. The line joining the center of the two spheres is called the sphereo baseline. The area and shape of the uncertainty region is also dependent on the baseline magnitude D and the baseline orientation $\theta$. In three dimensions the uncertainty region is a volume bounded by a polyhedron.

Figure 6:
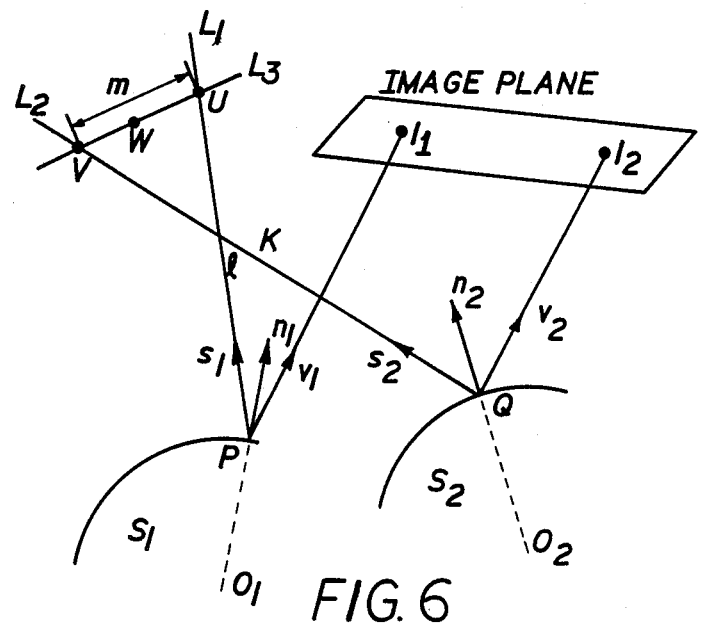
FIG. 6 illustrates triangulation in three dimensions with respect to a sphereo system.

Factors such as noise and pixel resolution are known to cause inaccuracies in the positions of extracted features. Consequently, triangulation in three dimensions may not result in the intersection of the projection lines $L_1$ and $L_2$ shown in FIG. 2. The two lines may only pass each other in close proximity, without actually intersecting. Rather than attempting to intersect the line $L_1$ and $L_2$, as shown in FIG. 6. The unit vector $s_3$ on the direction of $L_3$ is computed as:

$$s_3 = S_3/|S_3|, \tag{10}$$

where, $$S_3 = s_1 \times s_2.$$

The line $L_3$ intersects lines $L_1$ and $L_2$ at the points $U(x,y,z)$ and $V(x,y,z)$ respectively. Let k,l and m be the distances between the points U and P, V and Q, and U and V, respectively. The coordinates of points U and V can be expressed as:

$$U = P + ks_1, \tag{11}$$

$$V = Q + ls_2 \text{ and,}$$

$$V = U + ms_3.$$

The parameters k,l and m can be determined by eliminating U and V in the above set of equations:

$$ks_1 - ls_2 - ms_3 = Q - P. \tag{12}$$

Depth is computed only at points that have a high measure of triangulation. The triangulation measure is formulated as a function of the length k of the common normal, and the distances l and m of the common normal from the spheres $S_1$ and $S_2$, respectively. In the sphereo system 10, a successful match or intersection is found between corresponding image points when:

$$l + m/2k > T, \tag{13}$$

where T is an empirically determined threshold value. For a successful match, the point of intersection W is defined as the mid-point of the common normal:

$$W = U + V/2. \tag{14}$$

Though corresponding points have matching feature values, the triangulation of all pairs of matching points proves to be computationally inefficient. As in stereo, the imaging geometry may be used to impose physical constraints on the positions of corresponding points in the image. These constraints result in considerable reduction of the search space for corresponding points. Consider a camera 12 image of the two spheres. The projection of each sphere is a circular section in the image. Each point inside the circular section is the projection of a point on the surface of the sphere. The image sections corresponding to the spheres $S_1$ and $S_2$ shall be denoted by $CS_1$ and $CS_2$, respectively. When constraints are not used, the features computed at each point in $CS_1$ have to be compared with features at all points in $CS_2$. Therefore the search space for the point in $CS_2$ that correspondence to $CS_1$ is the entire two dimensional section $CS_2$.

Figure 7:
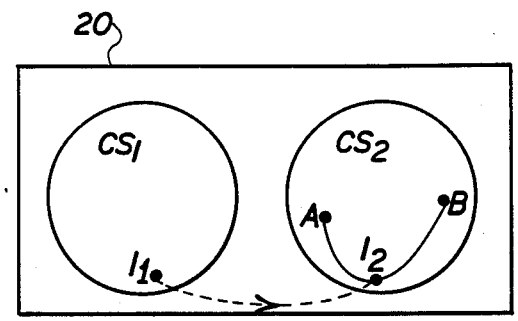
FIG. 7 illustrates the epipolar constraint concerning the reflections from two spheres with respect to an image plane.
Figure 8:
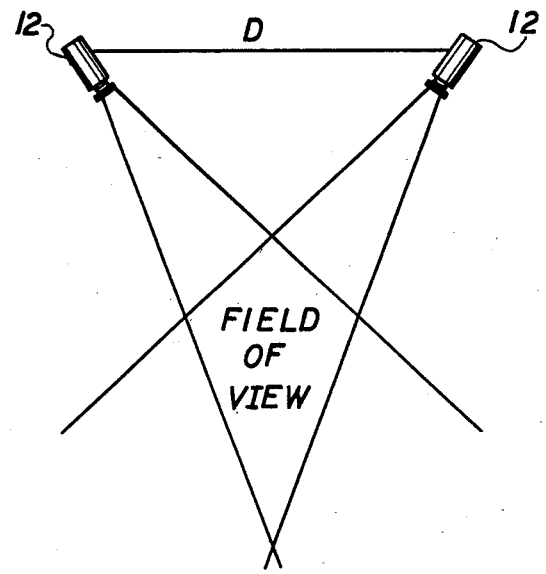
FIG. 8 shows the field of view of a typical stereo system.
Figure 9:
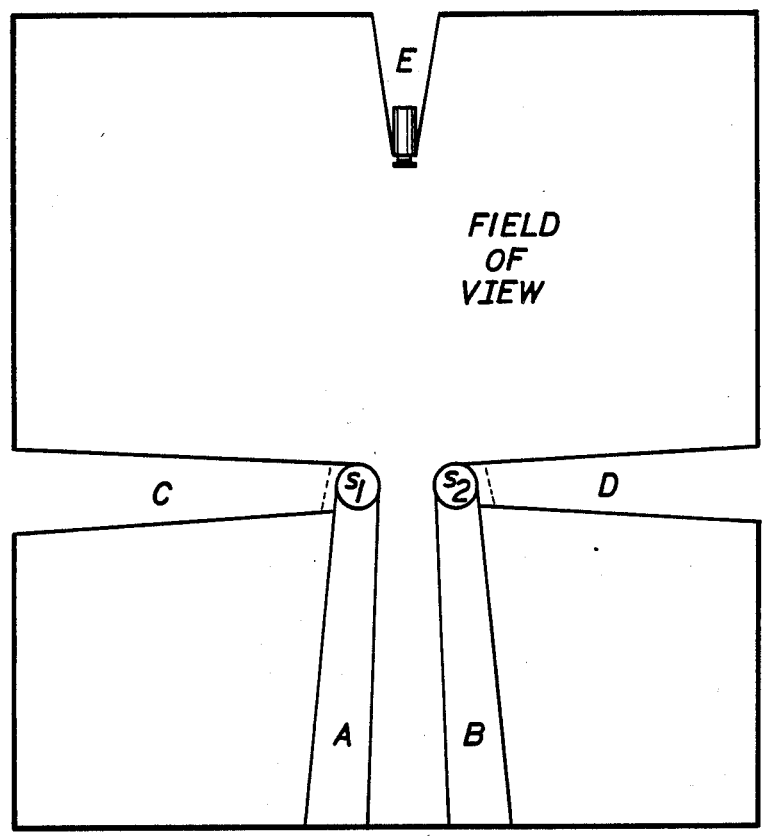
FIG. 9 shows the field of view of a sphereo system.

Consider the sphereo imaging geometry shown in FIG. 2. The image point $I_1$ is the projection of the point W by the sphere $S_1$. Given the point $I_1$, it is known from the camera model and the specular constraint that W must lie on the line $L_1$. Therefore, the point $I_2$ that corresponds to $I_1$ must lie on the image projection of the line $L_1$ by the sphere $S_2$. This is the epipolar constraint. The image projection of line $L_1$ by sphere $S_2$ is called the epipolar curve. As shown in FIG. 7, the search space for this point $I_2$ that corresponds to the point $I_1$, is reduced from the two-dimensional section $CS_2$ to a one-dimensional epipolar curve AB. If a feature match is determined between a point in $CS_1$ and a point on its epipolar curve in $CS_2$ then a high measure of triangulation is ensured.

Epipolar curves for each point in the section $CS_1$ can be pre-computed and stored. Consider, for example, the epipolar curve corresponding to the image point $I_1$ in FIG. 6. A point U on $L_1$ may be expressed as equation 15 here:

$$U(l) = P + ls_1. \tag{15}$$

where l is the distance of U from P. The point Q(l) on sphere $S_2$ that reflects U(l) into the camera is determined by using the specular constraint and by assuming an orthographic camera projection. The point Q(l) is then projected to the point $I_2$(l) in the image plane, by using the camera parameters. The epipolar curve for $I_1$ is thus determined by computing $I_2$(l) for all the l in the interval $0 < l < l_{max}$, where $l_{max}$ is the greatest distance of a measured point from sphere $S_1$. The image coordinates of points on the epipolar curves are stored in memory in the computer 14. Matches for a point in $CS_1$ are obtained by comparing its feature value to those on its epipolar curve in $CS_2$.

Another beneficial aspect of the sphereo system 10 is that its field of view is a great improvement over that of stereo systems. This is primarily due to the use of specular spheres for sphereo imaging. The surface of a specular sphere may be thought of as being constructed by a infinite number of small planar mirrors. Since no two points on a sphere have the same surface normal, each planar mirror faces in a unique direction. Also, the complete set of mirrors span the normal space. Consider a specular sphere placed in the view of a camera 12. Under the assumption of orthographic projection, the viewing direction is constant over the entire field of view of the camera. Any non-occluded point in space is reflected in the direction of the camera by a single point on the surface of the sphere. Therefore, the field of view of a sphereo system is constituted by all points that can be reflected on to the image plane by both spheres. Both spheres are placed in the focal plane of the camera and therefore the image projection of points in the world is not affected by the depth of field of the camera 12.

In FIG. (9) the shaded region denotes the sphereo system 10 field of view. The measurable range is not confined to the field of view of the camera 12. Points in regions A and B are not reflected into the camera by spheres $S_1$ and $S_2$, respectively. Points in region C are occluded by $S_1$ and thus are not reflected into the camera by $S_2$. Similarly, points in region D are occluded by $S_2$ and thus are not reflected into the camera by $S_1$. Region E represents points that are occluded by the camera and are not visible to either sphere $S_1$ or $S_2$.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A robotic vision system for identifying the location of objects comprising:
    means for recording images;
    n elements where $n \geq 2$, and is an integer, each of said n elements disposed at a predetermined position such that each of the n elements is in view of the recording means and reflections of objects from each of the n elements is directly received by the recording means; and
    means for determining the locations of objects from the image received by the recording means, said recording means connected to the determining means to provide the viewed image thereto.

2. A system as described in claim 1 wherein the recording means is a camera.

3. A robotic vision system for identifying the location of objects comprising:
    a camera;
    n spheres where $n \geq 2$, and is an integer, each of said n spheres disposed at a predetermined position such that each of the n spheres is in view of the camera and reflections of objects from each of the n spheres is received by the recording means; and
    means for determining the locations of objects from the image received by the recording means, said recording means connected to the determining means to provide the viewed image thereto.

4. A system as described in claim 3 wherein the determining means is a computer electrically connected to the camera to receive images therefrom.

5. A system as described in claim 4 wherein the computer calculates with respect to a given reflection in one of the n spheres the epipolar curve for the reflections in each of the other spheres in order to determine the corresponding reflections from each sphere, and from the corresponding reflections from each sphere determines the location of the object associated with the corresponding reflections.

6. A system as described in claim 5 including means for illuminating the objects.

7. A system as described in claim 6 wherein each sphere is fixed in a predetermined position and has a glossy surface that is highly reflective of light.

* * * * *